Dec. 29, 1931.  E. SCHADED  1,839,053
SAFETY GAS FIXTURE
Filed April 8, 1931
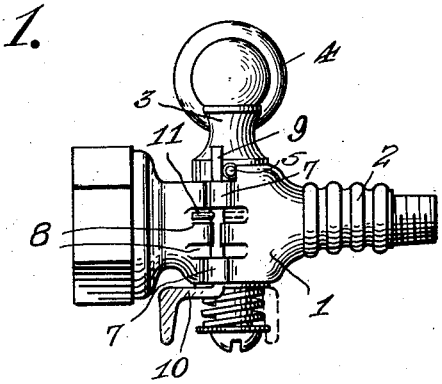
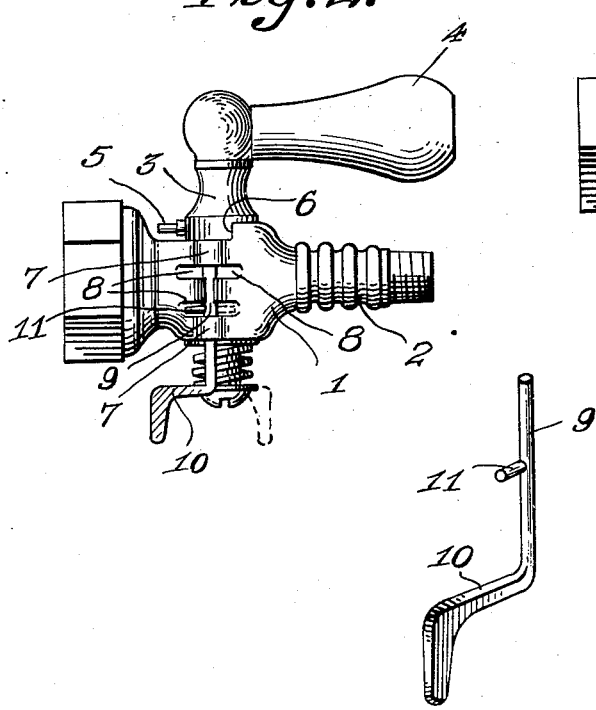
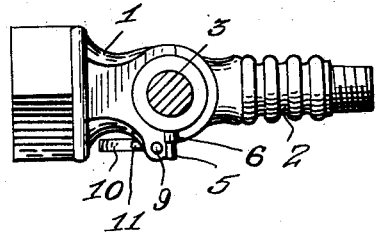
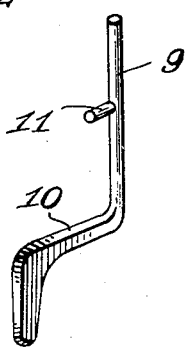
Enis Schaded, INVENTOR
BY Victor J. Evans and Co. ATTORNEYS Patented Dec. 29, 1931

1,839,053

UNITED STATES PATENT OFFICE

ENIS SCHADED, OF PADUCAH, TEXAS

SAFETY GAS FIXTURE

Application filed April 8, 1931. Serial No. 528,672.

This invention relates to a safety gas fixture and has for its object to produce an improved article of this class wherein the cock is locked in position when turned off and may not be turned on again except by the release of the locking mechanism.

In the accompanying drawings:—

Figure 1 is a side elevational view of the fixture showing the cock at locked position.

Figure 2 is a similar view of the gas fixture showing the cock thereof released and at opened position.

Figure 3 is a top plan view of the fixture with parts shown in sections.

Figure 4 is a perspective view of a locking shaft used upon the fixture.

As illustrated in the accompanying drawings the fixture consists of a body 1 having a nipple 2 the said body being adapted to be connected with the gas service pipe (not shown). A cock 3 is rotatably mounted in the body 1 and is provided with a usual handle 4 and a stud 5 adapted to engage the shoulder 6 of the body when the cock is at closed position as shown in Figure 1 of the drawings. The body 1 is provided at its side with outstanding lugs 7 and with recesses 8 located adjacent the inner walls of the lugs. A shaft 9 is journaled in the lugs 7 and may slide therein. The shaft 9 is provided at its lower end with a crank handle 10 and is provided at its side with an outstanding stud 11 adapted to enter either of the recesses 8. When the stud 5 is against the shoulder 6 as is shown in Figure 1 of the drawings the shaft 9 is slid vertically through the lugs 7 and the stud 11 is turned into the upper recess 8. Thus the upper end of the shaft 9 lies transversely across the stud 5 and the cock 3 is locked at a closed position. When it is desired to open the cock the shaft 9 is moved to the position as shown in Figure 2 of the drawings then the cock 3 may be turned in the body and moved to opened position.

Having described the invention what is claimed is:—

1. A safety gas fixture comprising a body, a cock journaled in the body and having a stud adapted to engage the wall of the body, the body having spaced lugs and recesses adjacent the edges of said lugs, a shaft journaled in the lugs and having an end portion adapted to extend transversely across the stud upon the cock, said shaft having a stud adapted to enter the recesses.

2. A safety gas fixture comprising a body having spaced lugs and spaced recesses, a cock journaled in the body and having a stud adapted to engage the wall of the body, a shaft journaled in the lugs and having a crank handle and provided at its side with an outstanding stud adapted to enter the recesses upon the body.

In testimony whereof I affix my signature.

ENIS SCHADED.